(12) United States Patent
Jiang

(10) Patent No.: US 6,325,353 B1
(45) Date of Patent: Dec. 4, 2001

(54) CARRIER FOR DISK DRIVE HOT SWAPPING

(75) Inventor: Kevin G. Jiang, Steilacoom, WA (US)

(73) Assignee: Intel Corporation, Santa Monica, CA (US)

( * ) Notice: Subject to any disclaimer, the term of this patent is extended or adjusted under 35 U.S.C. 154(b) by 0 days.

(21) Appl. No.: 09/264,650

(22) Filed: Mar. 8, 1999

(51) Int. Cl.⁷ .................. F16M 11/00; A47G 29/00; G06F 1/16
(52) U.S. Cl. .................. 248/682; 248/694; 361/685
(58) Field of Search .................. 248/682, 694; 361/685

(56) References Cited

U.S. PATENT DOCUMENTS

| | | | |
|---|---|---|---|
| 4,460,143 | * 7/1984 | Ohama | 248/682 |
| 5,483,419 | * 1/1996 | Kaczeus, Sr. et al. | 361/685 |
| 5,644,559 | 7/1997 | Christie, Jr. et al. | |
| 5,668,696 | 9/1997 | Schmitt . | |
| 5,761,031 | 6/1998 | Ajmani . | |
| 5,764,434 | 6/1998 | Hanson . | |
| 5,777,845 | * 7/1998 | Krum et al. | 361/685 |
| 5,822,184 | * 10/1998 | Rabinovitz | 361/685 |
| 5,825,615 | 10/1998 | Ohara . | |
| 5,828,546 | * 10/1998 | Tirrell et al. | 361/685 |
| 5,844,747 | 12/1998 | Wang . | |
| 6,064,568 | * 5/2000 | Schmitt | 361/685 |

OTHER PUBLICATIONS

Intel, Redundant Array of Independent Disks (RAID) 9 pages.
Intel, "Server Features" 7 pages.

* cited by examiner

*Primary Examiner*—Ramon O. Ramirez
*Assistant Examiner*—Jerome A. DeLuca
(74) *Attorney, Agent, or Firm*—Fish & Richardson, P.C.

(57) ABSTRACT

In general the invention features a disk drive carrier and a method for inserting a disk drive into a peripheral bay chassis. The disk drive carrier includes a base for receiving a disk drive into and a latching mechanism that is rotatably attached to the base. The rotatably mount permits a lever to rotate between an open position and a closed position. The lever includes a lower engagement point and an upper engagement point. The disk drive carrier can additionally include a downwardly movable release tab attached to the upper engagement point facilitating release of the engagement point from a P-Bay chassis. The disk drive carrier can also include an electromagnetic interference (EMI) shield to create a tight EMI seal in the front of a P-Bay chassis slot.

8 Claims, 4 Drawing Sheets

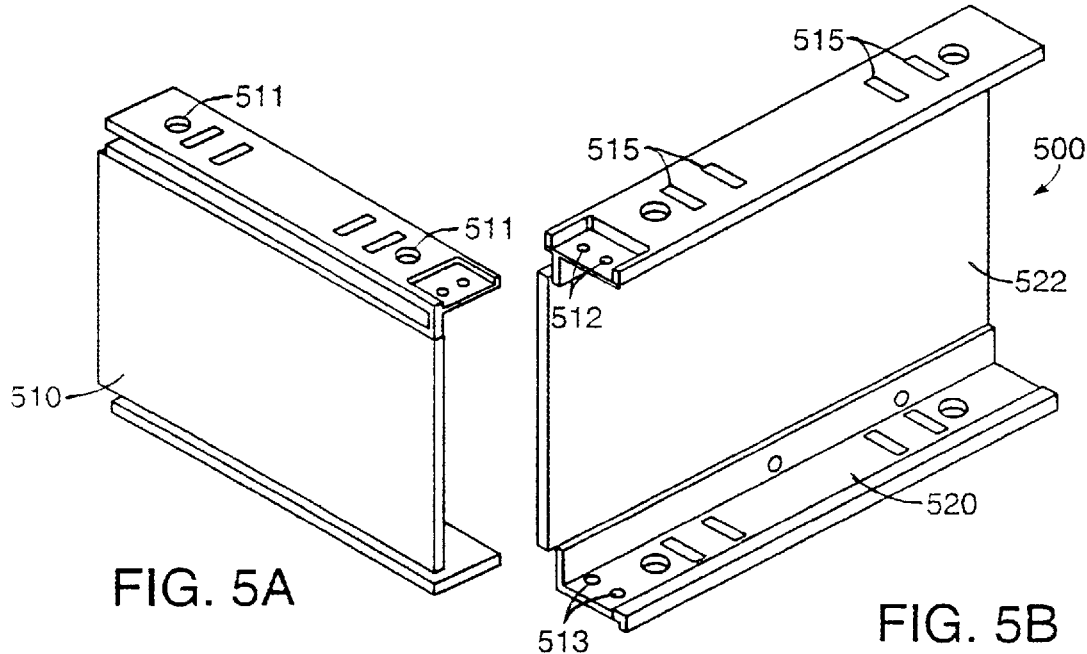
FIG. 5A
FIG. 5B
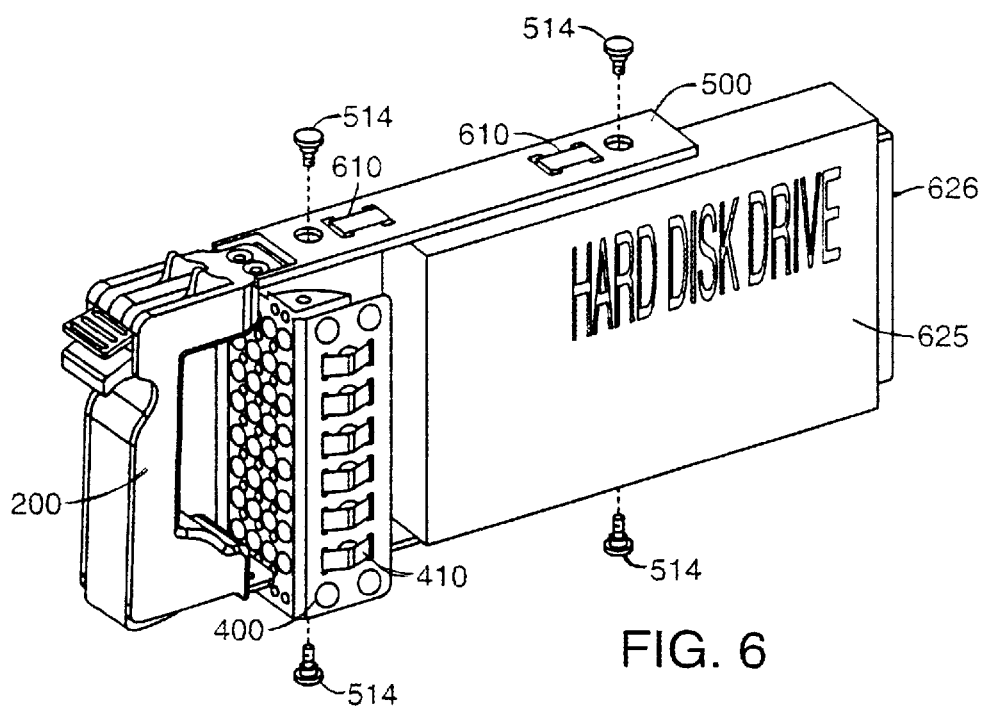
FIG. 6

CARRIER FOR DISK DRIVE HOT SWAPPING

BACKGROUND OF THE INVENTION

This invention relates to disk drive hot swapping. PC networks and, in particular, client server technology have created a need for network servers comprising relatively large and fast processors and random access memory coupled to an expandable array of large, fast hard drives. The hard drives provide non-volatile storage for application programs and data. One efficient method of providing for non-volatile storage is through an array of relatively inexpensive disk drives that can act in concert to provide nonvolatile storage that is faster and more reliable than a single, large, expensive hard disk drive.

One technology that enables inexpensive hard drives to cooperate is generally known as a redundant array of inexpensive disks or RAID and is particularly useful in the environment of network servers. RAID provides data redundancy such that if a single disk drive fails, lost data can be reconstructed from data stored on the remaining disks. In addition, multiple hard drives can be mirrored whereby copies of application programs and data are simultaneously stored on multiple disks. In the event of disk failure, a mirror image of a failed drive is available on another disk.

A RAID can be monitored and in the event of a disk drive failure, the failed disk can be replaced and data restored without interrupting the operation of a server. In addition, an operational disk drive can be removed and archived at the same or a remote location. An archived disk drive can also be replaced without interrupting the operation of a server. In order to replace a hard drive while the system is operational, a disk drive is "hot swapped," the term "hot" referring to live voltage and signals being applied to the drive while it is being removed and replaced.

Typically, a RAID is housed in a peripheral bay chassis (P-Bay). A P-Bay chassis can efficiently arrange hard drives and supply them with power, control and data connections, while allowing for adequate cooling of hard drives housed within it. A computer can be electrically connected to the P-Bay and thereby be given the advantages of having multiple disk drives.

Hard drives have been known to be mounted into a P-Bay chassis by bolting the drive into the chassis, using a cam driven handle to insert the drive into the chassis and other mechanisms. To limit vibrational effects, each hard drive needs to be securely mounted into the chassis.

SUMMARY

In general the invention features a disk drive carrier and a method for inserting a disk drive into a peripheral bay chassis. In one aspect of the invention the disk drive carrier includes a base for receiving a disk drive and a latching mechanism rotatably attached to the base permitting a lever to rotate between an open position and a closed position. The lever includes a lower engagement point and an upper engagement point.

In general, in another aspect, the invention features a base for mounting a disk drive. The base includes a channel formed with an upper surface and a substantially flat interior. The base also includes a lower surface with a substantially flat interior and a side wall with a finned exterior.

In general, in another aspect, the invention features an electromagnetic interference (EMI) shield. The EMI shield can include a multi-venthole frontal plate connected at a substantially right angle to a side panel.

In general, in another aspect, the invention includes a method for inserting a disk drive into a peripheral bay chassis. The method can include the steps of receiving a disk drive into a base of a disk drive carrier and inserting the carrier into a peripheral bay chassis slot while a lever is in an open position. The lever can then be rotated to the closed position to engage the peripheral bay chassis with the lower engagement point and the upper engagement point.

Other features and advantages of the invention will be apparent from the description, drawings and claims.

BRIEF DESCRIPTION OF THE DRAWINGS

FIG. 5(a) and FIG. 5(b) are views of a base.

FIG. 6 is a carrier assembly including a hard drive.

DETAILED DESCRIPTION

Figure 1A:
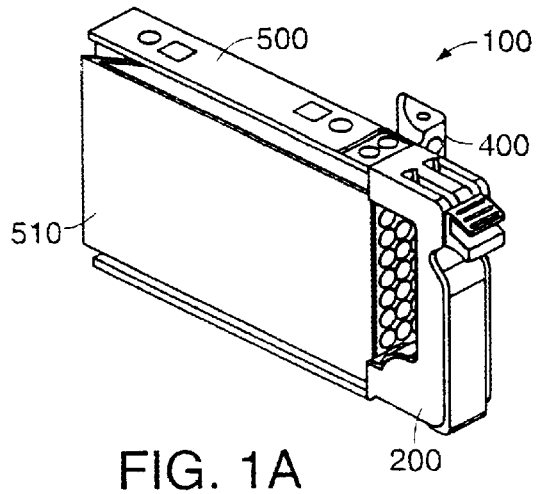
FIG. 1(a) and FIG. 1(b) are isometric views of an assembled carrier.
Figure 1B:
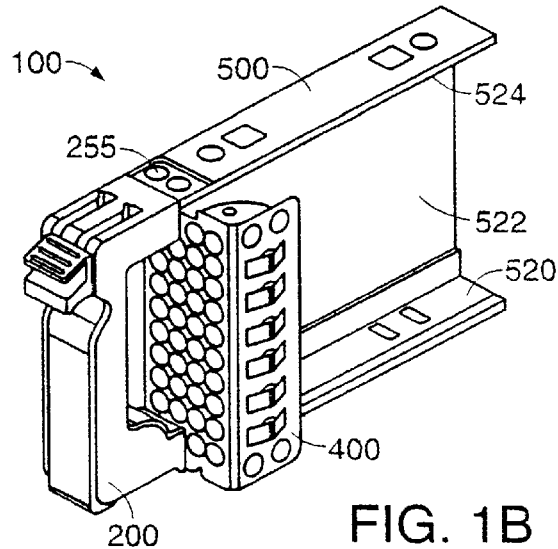

FIG. 1 illustrates a server disk drive carrier assembly 100. The disk drive carrier assembly includes a latching mechanism 200, an electromagnetic interference (EMI) shield 400 and a base 500.

The base 500 holds a computer disk drive and serves as a heat sink to dissipate heat generated by the disk drive. The base 500 typically comprises an electrically and thermally conductive material such as aluminum and is formed to provide a channel that matches the size and shape of a hard drive. Referring also to FIG. 5, the base can be formed so that the channel has a substantially flat interior upper surface 524; a substantially flat interior lower surface 520; and a side wall with a finned exterior 510 and a contoured interior surface 522. Referring also to FIG. 6, the contoured interior side surface 522 compliments the exterior contour of a hard drive 625 that can be mounted between the upper surface 524 and lower surface 520. The finned exterior 510 aids in dissipating heat. To maximize heat transfer from a drive to the base the hard drive may be mounted within the base in contact with interior upper surface 524, interior lower surface 520 and interior side surface 522.

Figure 7:
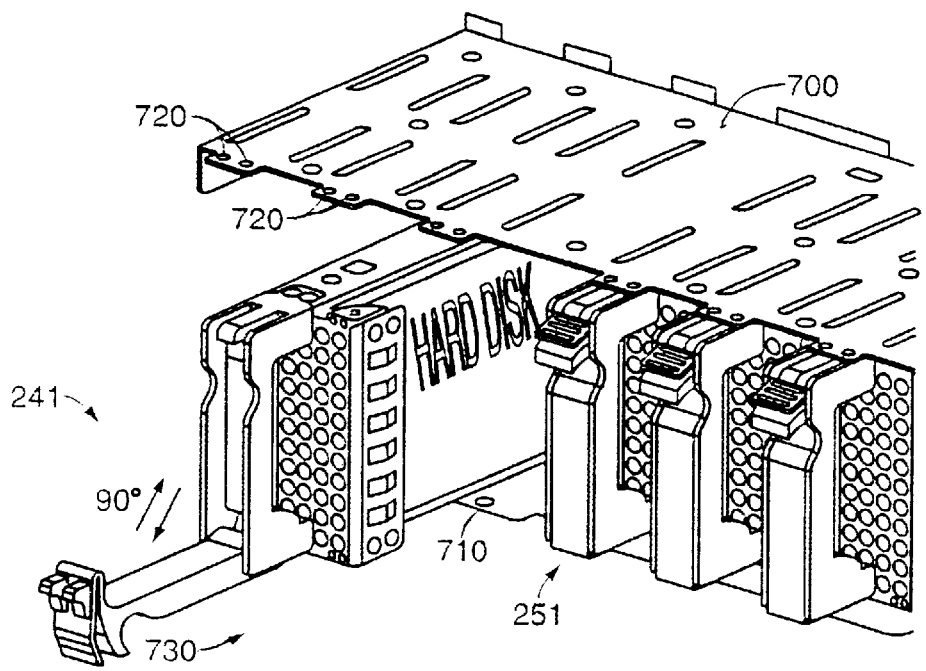
FIG. 7 is an isometric view of a P-Bay chassis with carriers.
Figure 8:
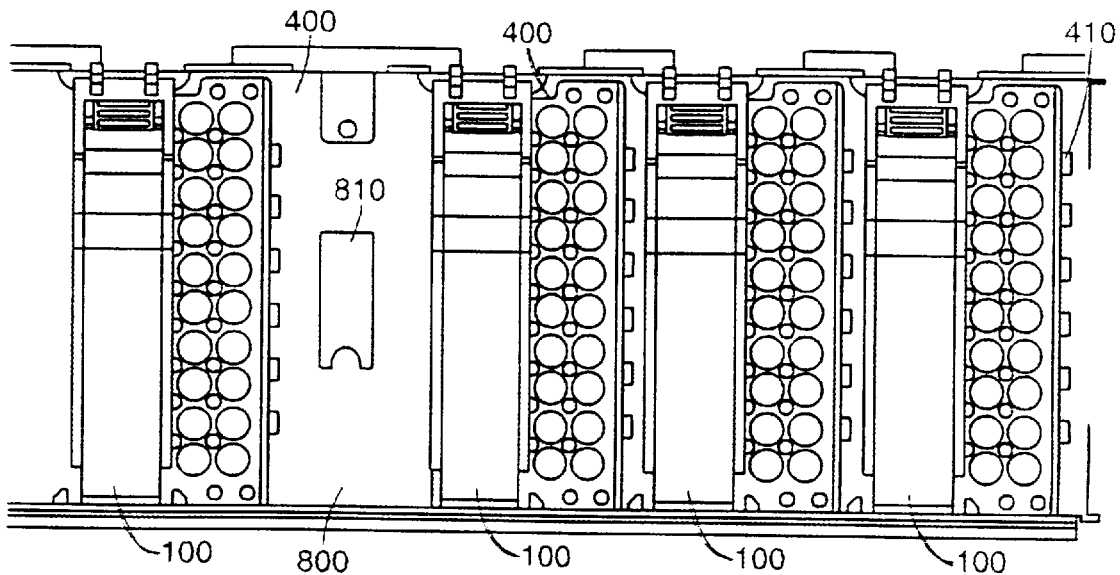
FIG. 8 is a frontal view of a P-Bay chassis with carriers.

A computer disk drive 625 can be secured to the base with one or more fasteners such as flat head machine screws 514 inserted through mounting holes 511 formed into the base and set into the drive 625. Forming a base from an electrically conductive material is useful for grounding a hard drive 625 mounted therein and acting as an electrical path to dissipate electrostatic charges that may build up near the drive 625. An electrical path from the base 500 to a grounded P-Bay chassis 700 (FIG. 7) can be provided through metal retention clips 610 inserted into retention clip slots 515 formed into the base 500. The retention clips 610 can also hold a base into a P-Bay chassis 700 and provide increased vibration control.

Figure 2A:
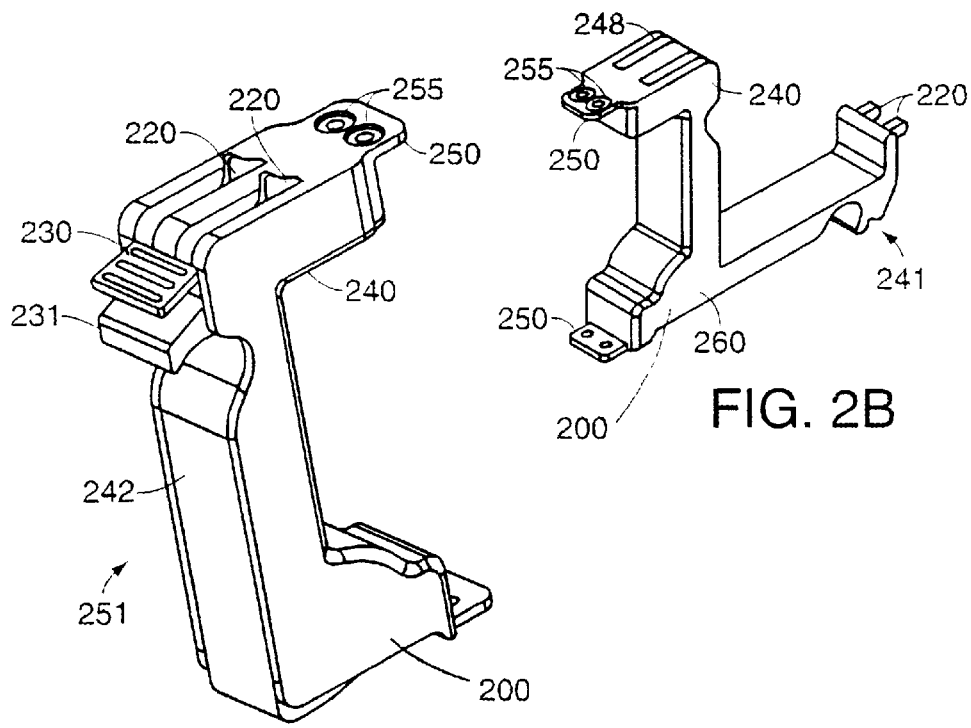
FIG. 2(a) and FIG. 2(b) are views of a latching mechanism.
Figure 2B:
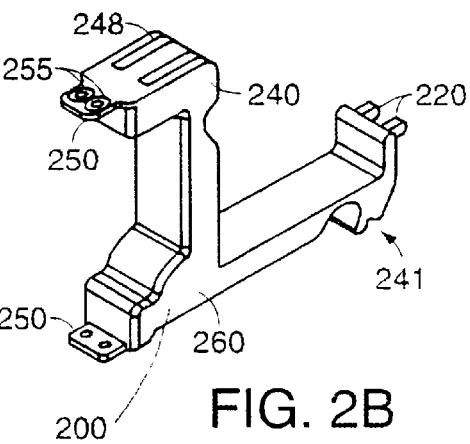
Figure 3:
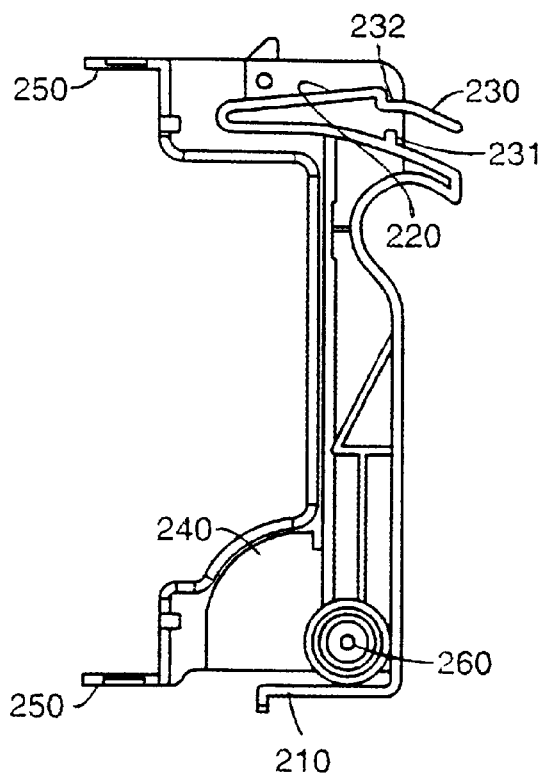
FIG. 3 is a profile perspective of a latching mechanism.
Figure 4:
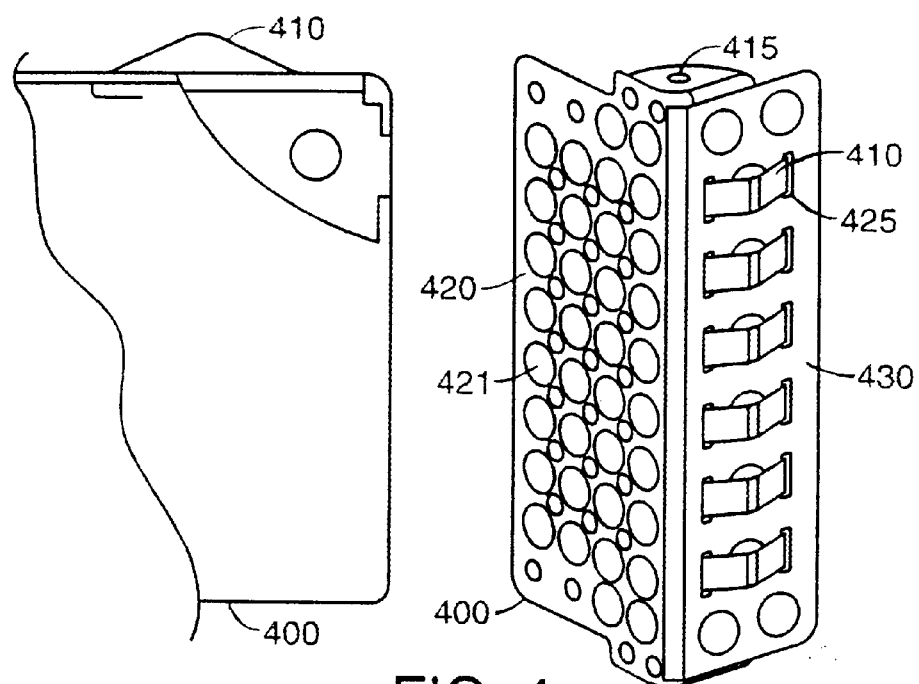
FIG. 4 is an EMI shield.

As seen in FIGS. 2 and 3, latching mechanism 200 comprising upper and lower locking points for holding the base in a P-Bay chassis is securely attached to one end of the base. The lower locking point comprises an engagement lug 210 and the upper locking point comprises at least two engagement shoulders 220. The latching mechanism can form a carrier handle 240 and be attached to the base 500 using one or more fasteners such as a machine screw 516 inserted through a hole 255 and set into the base 500. The carrier handle can be ergonomic in design to facilitate ease of use.

The latching mechanism 200 has a lever 242 rotatably mounted on a pivot 260 so as to rotate between an open position 241 and a closed position 251. In one example a lever 242 in a fully open position 241 is oriented at 90° from a fully closed position 251. Lower engagement lug 210 and the upper engagement shoulders 220 project in opposite directions from opposite ends of the lever. The lower engagement lug 210 and the upper engagement shoulder 220 may be offset from the rotatable mount 260. An offset causes a general U shape in the handle as a path through its lower engagement hug 210, the pivot point 260 and the upper engagement shoulder 220 is not linear.

The lower engagement lug 210 mates with a lower cutout 710 in a P-Bay chassis 700, securing the carrier 100 into the P-Bay chassis 700 when the lever 242 is in the closed position 251. In one embodiment, the lower engagement lug 210 engages the lower cutout 710 while the lever 242 is less than fully closed.

The upper engagement shoulder 220 is attached to the top of a release tab 230. The release tab 230 is flexibly secured to the lever 242 and downwardly movable. A lower release tab stop plate 231 limits the downward motion of the release tab 230, and can also serve as a finger hold. An upper stop point 232 limits the upward movement of the release tab. The upper engagement shoulder can engage an upper cutout 720 in a P-Bay chassis while the lever is in a closed position 251. A downward pressure on the release tab 230 causes downward movement by the tab 330 and the upper engagement shoulders 220. Downward motion can cause the upper engagement shoulder 220 to disengage from the upper cutout 720 of the P-Bay chassis 700. If the upper engagement shoulder 220 is disengaged from the upper cutout 720, the lever 242 is released and can be moved into an open position 241.

Latching mechanism 200 may be formed from a plastic such as ABS or polycarbonate plastic. The latching mechanism can be economically formed using injection molding. The lower engagement lug 210, the upper engagement shoulder 220, the release tab 230, the release tab stop plate 231 and the lever 242 can all be formed from one piece of contiguous molded plastic. A second piece of molded plastic can comprise the handle 240 and securement pads 250 and be attached to the first piece of molded plastic via a rotatable mount 260 such as a pin or other hinge apparatus. The pin can also comprise ABS or polycarbonate plastic.

Shoulder slots 248 can be formed in the upper handle 240 to allow the engagement shoulders 220 to reach a fully closed position 251. The shoulder slots 248 can also serve to limit lateral movement of the latching mechanism lever 242 while the latching mechanism lever 242 is in the closed position 251. Each engagement shoulder 220 formed into the lever 242 should have a corresponding slot 248 formed into the handle.

The electromagnetic interference (EMI) shield 400 is mounted between the latching mechanism 200 and the base 500 and substantially perpendicular to the base 500. When the carrier 100 is inserted into a P-Bay chassis 700, the EMI shield 400 effectively creates a tight EMI seal in the front of the P-Bay chassis slot 800 by spanning any empty space and contacting an adjacent drive. Use of an EMI shield 400 can reduce the need for a separate EMI door on the chassis. The EMI shield 400 comprises an electrically conductive metal such as steel formed into a front panel 420 and a side panel 430. The side panel 430 is essentially perpendicular to the front panel 420. The panels can have vent holes 421 to allow airflow through the EMI shield 400, the airflow being conducive to cooling an operational disk drive 625 mounted in the carrier 100. The vent holes do not affect EMI shielding properties. The EMI shield can be mounted to the base with a fastener such as a machine screw through an EMI shield mounting hole 415 or other known fastening means, such as riveting.

The EMI shield 400 can be grounded to the chassis with one or more finger clips 410 mounted in finger clip slots 425. The finger clip slots 425 are formed into the side panel 430. The finger clips can be fashioned from an electrically conductive material with spring like characteristics, such as stainless spring steel. Generally, the finger clips form a spring loaded arc that compresses when perpendicular pressure is applied to the arc. As a carrier 100 is inserted into a P-Bay chassis 700, a finger clip 410 contacts the chassis 700 or an adjacent carrier and compresses. The force of the compression against the contact point causes a mechanical and electrical connection. The mechanical connection provides additional stability to the drive. The electrical connection provides a low insertion force ground to the carrier 100 and hard drive 625 mounted therein while the carrier 100 is being inserted into the chassis 200 and before a disk drive 625 connector mates with a high speed back plane (HSBP) 810. Grounding the carrier 100 before contact with the HSBP 810 provides a conductive path providing for electrostatic discharge into the chassis 700 instead of the HSBP 810. The finger clips 410 may be replaceable to extend the useful life of the EMI shield 400.

A user can install a hard drive 625 into a P-Bay chassis by mounting an original equipment manufacturer (OEM) disk drive into the base 500. In one embodiment the disk drive 625 is mounted using two screws 514 through the upper surface 524 of the base 500 and two screws 514 through the lower surface 520 of the base 500. The carrier is inserted 730 into a P-Bay chassis slot 800 with the lever 242 in an open position (lever is at an angle greater than 0° and less than 90° to the carrier handle). A user can depress the release tab 230 by applying downward pressure, and fully insert the carrier 100 into the P-Bay chassis 700 causing the disk drive connector 626 to engage with the HSBP 810. The user can then move the lever 242 into the closed position (~0°). As the lever 242 is closed the lower engagement lug 210 will insert into a lower cutout 710 latching the bottom of the carrier 100. The user allows the release tab 230 to return up to its rest position causing the upper engagement shoulder 220 to engage an upper cutout 720 thereby latching the top of the carrier to the P-Bay chassis 700. As the carrier 100 proceeded into the P-Bay chassis 700, the finger clips 410 tightly contact an adjacent carrier in an adjacent P-Bay chassis slot 800 grounding the carrier 100 before the disk drive connector engaged the HSBP 810.

The invention may provide advantages that include improved vibration control, ease of use for a technician swapping drives, limited horizontal movement of a carrier, excellent EMI shielding and less restricted air flow for cooling of disk drives.

Other embodiments are within the scope of the following claims.

What is claimed is:

1. A disk drive carrier comprising:
   a base for receiving a disk drive, said base spanning a height between a lowermost exposed surface of the base and an uppermost exposed surface of the base; and a latching mechanism rotatably attached to the base permitting a lever to rotate between an open position and a closed position, the lever comprising:
a body having a length;
a lower engagement point configured to secure said base to an engagement feature of a chassis; and
an upper engagement point extending beyond the length of the lever body and extending, when the latching mechanism is in the closed position, beyond the uppermost surface of the base and configured to secure said base to a corresponding engagement feature of the chassis.

2. The disk drive carrier of claim 1 additionally comprising a release tab attached to the upper engagement point, said release tab being downwardly movable.

3. The disk drive carrier of claim 1 wherein the lower engagement point comprises a lug.

4. The disk drive carrier of claim 1 wherein the upper engagement point comprises a shoulder.

5. The disk drive carrier of claim 1 additionally comprising a securement pad attached to the latching mechanism.

6. The disk drive carrier of claim 1 additionally comprising a handle calculating carrier insertion into the chassis, the handle being attached to the lever.

7. The disk drive carrier of claim 1 wherein the latching mechanism is formed of molded plastic.

8. The disk drive carrier of claim 1 wherein the latching mechanism comprises polycarbonate plastic.

* * * * *